United States Patent [19]

Allard

[11] Patent Number: 4,521,790
[45] Date of Patent: Jun. 4, 1985

[54] ELECTROSTATIC PRINTER OF VIDEO PICTURES WITH GREY TONES

[75] Inventor: Emmanuel M. Allard, Paris, France

[73] Assignee: Gould Inc., Rolling Meadows, Ill.

[21] Appl. No.: 453,534

[22] Filed: Dec. 27, 1982

[30] Foreign Application Priority Data

Mar. 24, 1982 [FR] France .................. 82 05355

[51] Int. Cl.³ .......................................... G01D 15/06
[52] U.S. Cl. .................................. 346/154; 346/155; 358/298
[58] Field of Search .................. 346/154, 155, 153.1, 346/139 C; 358/300, 298; 101/DIG. 13

[56] References Cited

U.S. PATENT DOCUMENTS 3,611,419 10/1971 Blumenthal ..................... 346/155
3,757,036 9/1973 Libbet et al. .................... 346/154

FOREIGN PATENT DOCUMENTS 1426631 3/1976 United Kingdom .

OTHER PUBLICATIONS

Ueno et al, "Video Printer Features High Recording Speed and Low Costs", J.E.E., Jul. 1977, pp. 55–57.

Primary Examiner—Thomas H. Tarcza
Attorney, Agent, or Firm—John R. Garrett; Edward E. Sachs

[57] ABSTRACT

This disclosure depicts an electrostatic grey tone printing device having a writing head for use with dielectric paper. The printing device comprises recording electrodes on the writing head having a substantially elongated cross-sectional geometry such that a width dimension is significantly less than a length dimension. Complementary electrodes are operatively associated with the recording electrodes and have a predetermined cross-sectional geometry. A means is provided for applying a first voltage of one polarity to one or more of the recording electrodes, and a means is provided for applying a second voltage of opposite polarity to one or more of the associated complementary electrodes. The printing device also comprises a means for advancing the dielectric paper past the complementary and recording electrodes in increments substantially equal to the width of the recording electrodes. The recording electrodes are oriented such that their width dimension is parallel to the direction of advancing paper. Also, the width dimension of the recording electrodes is sufficiently small to effect the appearance of grey tone areas.

10 Claims, 3 Drawing Figures

ELECTROSTATIC PRINTER OF VIDEO PICTURES WITH GREY TONES

BACKGROUND OF THE INVENTION

This invention relates in general to an electrostatic printing device, and in particular to an electrostatic printing device capable of printing grey tones. The electrostatic grey tone printing device is particularly useful in reproducing video pictures from a video signal.

Electrographic recording systems are well-known in the art and are typified by the type of systems shown in U.S. Pat. Nos. 3,611,419, 3,653,065 and 3,662,396. These electrographic recording systems utilize a series of recording electrodes and complementary electrodes. By proper application of voltages to the recording and complementary electrodes, a latent image may be formed on a dielectric paper which is moved past the electrodes. This latent image is then developed by well-known techniques in the art. The recording electrodes and complementary electrodes may be positioned either on the same side of the dielectric paper or on opposite sides of the dielectric paper. The recording electrodes and complementary electrodes are mounted in a device referred to as a writing head. The reproduction of a video picture by means of a multiple electrode writing head and a dielectric paper requires the ability to reproduce shades of grey. One approach is to vary the voltage on the recording electrodes in proportion to the desired density of black thereby producing a shade of grey; however, this process is unstable and gives unreliable results. As soon as the voltage on the recording electrodes is decreased, there is a risk of reaching the threshold where the ionized discharge in the air gap due to the surface roughness is not maintained. This threshold is unstable and varies with the roughness of the dielectric paper and also with other factors, such as the humidity of the air. If the voltage is increased and if a multiplexed electrode addressing system is used, there is a risk of producing ghost images.

Another approach for producing shades of grey is to provide a square matrix of a certain number of dots, for example four dots by four dots and to fill this matrix by a number of printed dots proportional to the desired level of grey. The drawback to this process is to sacrifice the picture resolution. In this example, if electrodes of 250 by 250 microns are used, the resolution of four dots per millimeter becomes one dot per millimeter. In order to recover the initial resolution, the number of electrodes should be multiplied by four, and the dimensions should be reduced to 62.5 by 62.5 microns. However, electrodes of these dimensions cause great difficulties in construction and significantly increased costs in manufacturing.

SUMMARY OF THE INVENTION

The present invention comprehends an electrostatic grey tone printing device having a writing head for use with dielectric paper. The printing device comprises recording electrodes on the writing head having a substantially elongated cross-sectional geometry such that a width dimension is significantly less than a length dimension. Complementary electrodes are operatively associated with the recording electrodes and have a predetermined cross-sectional geometry. A means is provided for applying a first voltage of one polarity to one or more of the recording electrodes, and a means is provided for applying a second voltage of opposite polarity to one or more of the associated complementary electrodes. The printing device also comprises a means for advancing the dielectric paper past the complementary and recording electrodes in increments substantially equal to the width of the recording electrodes. The recording electrodes are oriented such that their width dimension is parallel to the direction of advancing paper. Also, the width dimension of the recording electrodes is sufficiently small to effect the appearance of grey tone areas, since the length of the electrode is selected to correspond to the separation power of the eye.

OBJECTS OF THE INVENTIONS

It is a general object of the present invention to provide an improved electrostatic grey tone printing device.

It is a more specific object of the present invention to provide an electrostatic grey tone printing device capable of copying a video picture onto a dielectric paper.

It is yet another object of the present invention to provide a precise and reproducible number of grey levels without loss of resolution and without increasing the normal number of recording electrodes in the writing head.

It is another object of the present invention to provide an electrostatic grey tone printing device which is capable of reproducing a video picture at a reasonable rate of speed onto a dielectric paper.

It is still another object of the present invention to provide an electrostatic grey printing device in which the recording electrodes in the writing head are of a size practical to manufacture and cost effective.

BRIEF DESCRIPTION OF THE DRAWINGS

The features of the present invention which are believed to be novel are set forth with particularity in the appended claims. The invention, together with further objects and advantages, may best be understood by reference to the following description taken in conjunction with the accompanying drawings, in the several figures of which like reference numerals identify like elements and in which:

DESCRIPTION OF THE PREFERRED EMBODIMENT

This apparatus pertains to an electrostatic printing device capable of printing grey tones. The appearance of a grey tone may be achieved in a sufficiently small elementary dot area which is subdivided into discrete portions. These discrete portions are printed black or not printed in combinations depending upon the desired shade of grey. If all of the discrete portions are printed black, then the elementary dot area will also appear black, and if no printing of the discrete portions occurs, the elementary dot area will be white or the corresponding color of the dielectric paper.

Figure 2:
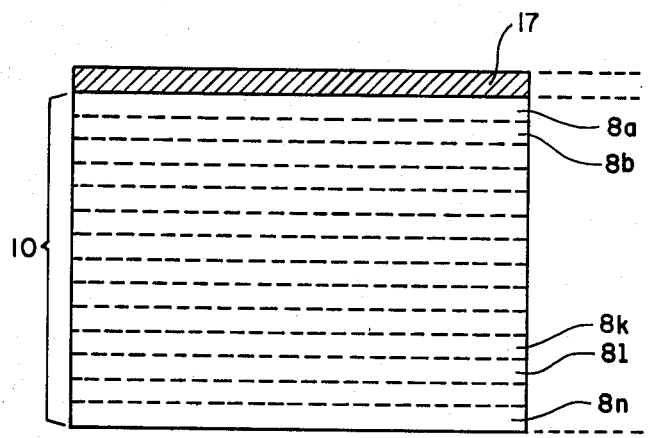
FIG. 2 is a representation of an elementary dot area corresponding to a preselected elementary area of the video picture. This elementary area is assumed to correspond to the separation power of the eye. Smaller areas are not separated.

One method of forming a shade of grey in the elementary dot area is to start printing on the discrete portions beginning with the first one (see FIG. 2). Area 17 depicts a printed area by one recording electrode 12 for one advance of the paper. The elementary dot area 10 is depicted divided into discrete portions 8a through 8n. A shade of grey is produced by printing on only some of the discrete portions 8a through 8n. For example, if discrete portions 8a and 8b are printed black and the rest of the discrete portions are not printed, a light shade of grey will appear. If discrete portions 8a through 8k are printed black, and discrete portions 8l to 8n are not printed, a darker shade of grey will appear. Alternatively, shades of grey can be effected by a predetermined pattern of printing and not printing various selected discrete portions 8a through 8n of the elementary dot area 10.

The preferred embodiment of the present invention utilizes the approach of printing the discrete portions of the elementary dot area in sequence until the desired level of grey is achieved and then not printing the remainder of the discrete portions. Since it is desired that the number of grey levels range evenly from a light grey to a dark grey, a predetermined pattern is established in which there is a one-to-one correspondence between the desired level of grey and the number of discrete portions printed in the elementary dot area. The sensation of a level of grey produced on an observer is proportional to the logarithm of light intensity according to the law of Weber-Fechner. To produce the sensations on a linear scale, this light intensity must increase in an exponential way. Therefore, to produce a linear scale of grey tones the number of discrete portions not printed occurs in an exponential manner.

Figure 3:
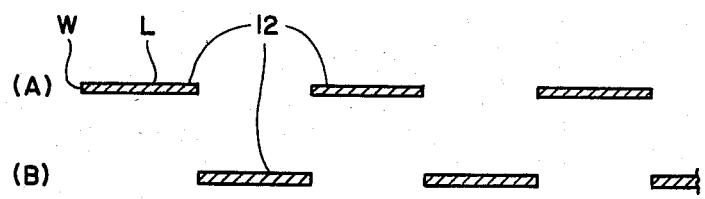
FIG. 3 is a schematic representation of the recording elements particularly pointing out the size and arrangement of the recording electrodes.

Numerous arrangements of recording electrodes and complementary electrodes to effect electrostatic printing are known in the prior art. FIG. 3 shows a preferred arrangement of the recording electrodes for the present invention. A novel aspect of a present invention is characterized by the fact that the recording electrodes 12 have a rectangular cross-section wherein the length, L, is significantly greater than the width, W. In the preferred embodiment, a length L, of 350 microns and a width, W, of 23 microns is utilized for each recording electrode 12. Therefore, the elementary dot area 10 has a size of approximately 350 by 345 microns and is divided into 15 discrete portions of 350 by 23 microns. Therefore, in the preferred embodiment, it is possible to obtain, in addition to black and white, fourteen levels of grey for the elementary dot area.

Because the recording electrodes 12 have a width of only 23 microns corresponding to the width of the discrete portions 8a through 8n of the elementary dot area 10, the dielectric paper must be advanced past the recording electrodes in microsteps of approximately 23 microns. This effectively reduces the paper speed as compared to a standard electrostatic printer. However, with a printing time of 500 microseconds per line, an A4 size picture can be printed in 4.91 seconds, which is an acceptable rate of printing for a video picture.

Print circuit techniques, which are well known in the art, may be utilized to form the recording electrodes on the writing head. The use of staggered recording electrodes as shown in FIG. 3 has the advantage of producing perfect coverage in black areas and providing enough isolation spacing between electrodes.

Continuous paper advancement can be utilized with the present invention, provided the paper speed is kept very constant and accurate. The use of a single complementary electrode requires one driver amplifier per recording electrode. With this approach to fill in more or less of an elementary dot area, a variable length pulse is applied to the recording electrode. However, by utilizing multiplexing techniques and several complementary electrodes, the number of electrode driving amplifiers is significantly reduced, and the cost of the system is also reduced. This is the preferred embodiment and is utilized with the microstep paper advancement.

Figure 1:
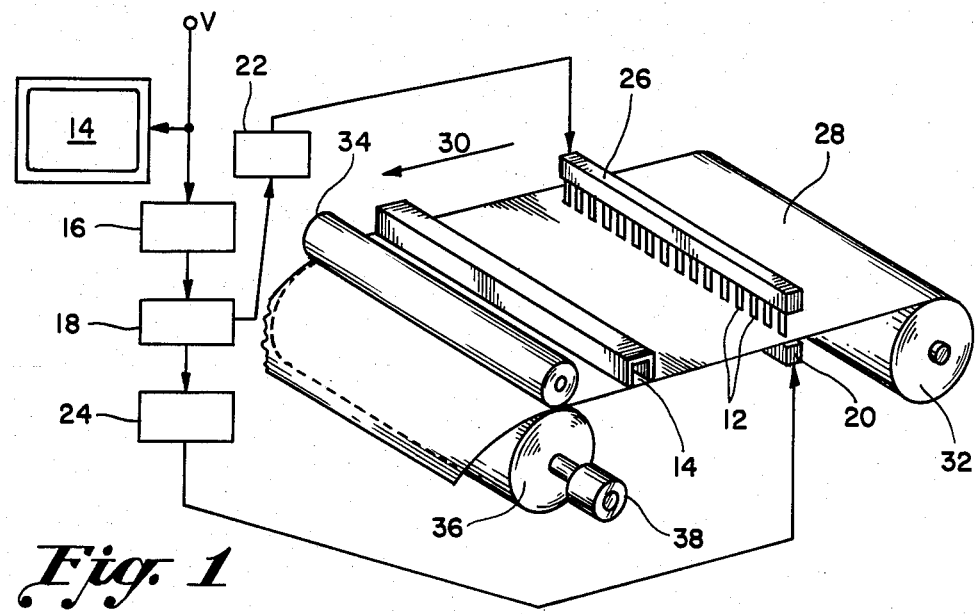
FIG. 1 is a schematic representation of the novel electrostatic grey tone printing device.

FIG. 1 shows a schematic representation of the present invention. A video signal V, able to form a video picture on a device 14 such as a television receiver or monitor, is utilized. A means 16 is provided for converting the video signal into a digital signal according to a predetermined pattern as previously discussed above for each elementary dot area, corresponding to elementary areas of the video pictures. The digital signal is then received by a means 18 for selectively energizing the recording electrodes 12 and the complementary electrodes 20 for each elementary dot area 10. The means 18 for selectively energizing is operatively connected to a means 22 for applying a first voltage of one polarity to one or more recording electrodes 12 and is also operatively connected to a means 24 for applying a second voltage of opposite polarity to one or more associated complementary electrodes 20.

The recording electrodes 12 are mounted on a writing head 26. The complementary electrodes 20 may also be formed as part of the writing head 26 on the same side of the paper as the electrodes, or, as shown in FIG. 1, are positioned on the opposite side of the electrostatic paper 28. In either case, the complementary electrodes 20 are operatively associated with the recording electrodes 26. The complementary electrodes 20 have a predetermined cross-sectional geometry according to well-known techniques in the prior art. In the preferred embodiment, a first voltage of negative 300 volts is applied to the recording electrodes 12, and a second voltage of positive 300 volts is applied to the complementary electrodes 20.

The electrostatic paper 28 is composed of a conductive substrate and a thin dielectric coating with the recording electrode 12 being positioned next to the dielectric coating. The dielectric paper 28 advances in the direction of arrow 30 as shown in FIG. 1. The dielectric paper 28 is removed from reservoir roll 32 and passes between drive rollers 34 and 36, which are powered by a microstepping drive motor 38. The drive motor 38 and drive rollers 34 and 36 form a means for advancing the dielectric paper past the recording electrodes 12 and the complementary electrodes 20 in increments substantially equal to the width, W, of the recording electrodes 12. Numerous other methods and apparatus may be utilized to advance the dielectric paper 28, which can also be used in the form of pre-cut sheets.

The invention is not limited to the particular details of the apparatus depicted, and other modifications and applications are contemplated. Certain other changes may be made in the above described apparatus without departing from the true spirit and scope of the invention herein involved. It is intended, therefore, that the subject matter in the above depiction shall be interpreted as illustrative and not in a limiting sense.

What is claimed is:

1. An electrostatic grey tone printing device having a writing head for use with a dielectric paper, said printing device comprising;
   recording electrodes on the writing head having a substantially elongated cross-sectional geometry, such that a width dimension is significantly less than a length dimension, said recording electrodes having a length, L, and a width, W;
   complementary electrodes operatively associated with said recording electrodes and having a predetermined cross-sectional geometry;
   means for applying a first voltage of one polarity to one or more recording electrodes;
   means for applying a second voltage of opposite polarity to one or more associated complementary electrodes; and
   means for advancing the dielectric paper past said complementary and recording electrodes in increments substantially equal to said width of said recording electrodes such that an elementary dot area is defined by advancing the dielectric paper approximately L divided by W times, said recording electrodes being oriented such that their width dimension is parallel to the direction of advancing the paper, and sufficiently small to effect the appearance of grey tone areas.

2. The apparatus described in claim 1 wherein said electrostatic grey tone printing device further comprises means for selectively energizing said recording and complementary electrodes for each advance of the dielectric paper, said means for selectively energizing operatively connected to said means for applying a first voltage and to said means for applying a second voltage.

3. The apparatus described in claim 2 wherein, when the dielectric paper is advanced to define one elementary dot area, said means for selectively energizing said recording and complementary electrodes in a predetermined pattern energizes selected electrodes to produce an elementary dot area having a predetermined shade of grey.

4. The apparatus described in claim 3 wherein said predetermined pattern of energizing said electrodes is exponentially related to the intensity the predetermined shade of grey.

5. The apparatus described in claim 3 wherein said predetermined pattern also includes energizing said electrodes at each advance of the paper to produce a completely black elementary dot area and not energizing said electrodes at each advance of the paper to produce a nonprinted elementary dot area.

6. An electrostatic grey tone printing device for use in recording a video picture resulting from a video signal and having a writing head for use with a dielectric paper, said printing device comprising:
   recording electrodes on the writing head having a substantially rectangular cross-sectional geometry with a length, L, which is significantly greater than a width, W;
   complementary electrodes operatively associated with said recording electrodes and having a predetermined cross-sectional geometry;
   means for applying a first voltage of one polarity to one or more recording electrodes;
   means for applying a second voltage of opposite polarity to one or more associated complementary electrodes;
   means for advancing the dielectric paper past said recording and complementary electrodes in increments substantially equal to said width, W, of said recording electrodes, such that an elementary dot area is defined by advancing the dielectric paper approximately L divided by W times (a predetermined number of increments), said recording electrodes being oriented such that their width, W, is parallel to the direction of advancing the paper;
   means for selectively energizing said recording and complementary electrodes for each elementary dot area in a predetermined pattern to produce a shade of grey corresponding to a preselected elementary area of the video picture, said means for selectively energizing operatively connected to said means for applying a first voltage and means for applying a second voltage; and
   means for converting said video signal into a digital signal according to said predetermined pattern, said means for converting operatively connected to said means for selectively energizing said recording and complementary elements.

7. The apparatus defined in claim 6 wherein said means for selectively energizing causes said means for applying a first voltage and said means for applying a second voltage to apply voltages to said recording and complementary electrodes for a selected number of increments during said forming of said elementary dot area having a selected shade of grey, such that there is a predetermined one-to-one relationship between said selected number of increments and the selected shade of grey.

8. The apparatus defined in claim 7 wherein said one-to-one relationship is exponential.

9. The apparatus defined in claim 7 wherein said substantially rectangular recording electrodes each have a length, L, of approximately 350 microns and a width, W, of approximately 23 microns and wherein said means for advancing the dielectric paper advances the paper 15 increments to form an elementary dot area of approximately 350 microns by 345 microns.

10. The apparatus defined in claim 9 wherein said electrostatic grey tone printing device can produce an elementary dot area which is completely black, completely nonprinted, or is one of fourteen shades of grey.

* * * * *